United States Patent
Sata et al.

(10) Patent No.: US 6,989,414 B2
(45) Date of Patent: Jan. 24, 2006

(54) AQUEOUS EMULSION COMPRISING ETHYLENE-VINYLESTER COPOLYMER

(75) Inventors: Tomoaki Sata, Toyonaka (JP); Tatsuo Mitsutake, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/096,644

(22) Filed: Mar. 14, 2002

(65) Prior Publication Data

US 2003/0105216 A1    Jun. 5, 2003

(30) Foreign Application Priority Data

Mar. 16, 2001   (JP) .............................. 2001-075717

(51) Int. Cl.
*C08K 5/00*    (2006.01)

(52) U.S. Cl. ..................... 524/375; 524/376; 524/755; 524/757; 524/758; 524/761; 524/563

(58) Field of Classification Search ................ 524/375, 524/376, 755, 757, 758, 761, 563
See application file for complete search history.

(56) References Cited

U.S. PATENT DOCUMENTS

| 3,714,078 A | * | 1/1973 | Grodon et al. ................ 521/65 |
| 5,446,072 A | * | 8/1995 | Mitsutake et al. ............ 521/54 |
| 6,197,865 B1 | * | 3/2001 | Koizumi et al. ............ 524/459 |
| 6,548,605 B1 | * | 4/2003 | Morita et al. ............ 525/330.6 |
| 6,635,725 B1 | * | 10/2003 | Sata ............................ 526/91 |

FOREIGN PATENT DOCUMENTS

| EP | 0 889 068 A2 | 1/1999 |
| JP | 6-009934 A | 1/1994 |
| JP | 6-065550 A | 3/1994 |
| JP | 11-071434 A | 3/1999 |
| JP | 2001-002715 A | 1/2001 |

\* cited by examiner

*Primary Examiner*—Tatyana Zalukaeva
(74) *Attorney, Agent, or Firm*—Fitch Even Tabin & Flannery

(57) ABSTRACT

An aqueous emulsion having excellent water resistant property and comprising a copolymer obtainable by polymerizing ethylene and vinyl ester, and a nonionic polyoxyalkylene surface active agent, wherein the nonionic polyoxyalkylene surface active agent comprises 1 to 10 parts by weight of polyoxyalkylene alkyl ether and 0.01 part by weight or less of polyoxyalkylene phenyl ether based on 100 parts by weight of vinyl ester units in the copolymer is provided.

11 Claims, No Drawings

US 6,989,414 B2

AQUEOUS EMULSION COMPRISING ETHYLENE-VINYLESTER COPOLYMER

BACKGROUND OF THE INVENTION

This invention relates to an aqueous emulsion comprising ethylene-vinyl ester copolymer and a polyoxyalkylene nonionic surface active agent.

Aqueous emulsions comprising an ethylene-vinyl ester copolymer such as ethylene-vinyl acetate copolymer, ethylene-vinyl acetate-vinyl chloride copolymer and ethylene-vinyl acetate-alkyl acrylate copolymer have been widely used, for example, for an adhesive, a coating agent, a paint, a binder for paper, fiber, wall paper and an admixture of cement.

As these aqueous emulsions, those comprising polyoxyalkylene phenyl ethers such as polyoxyethylene nonylphenyl ether as a nonionic surface active agent are excellent in storage and mechanical stabilities and have excellent strength after use, that is, in the dried state. (JP-A-06-065550, JP-A-06-009934, JP-A-11-071434, etc) Therefore, they are used favorably used.

However, the conventional aqueous emulsions are insufficient in water resistance in the dried state, and further improvement in the water resistance has been required. The object of the present invention is to provide an aqueous emulsion comprising ethylene-vinyl ester copolymer which gives an improved water resistance in the dried state.

Under such situation, the inventors of the present invention have conducted extensive investigations and have found that above problems can be solved by using an aqueous emulsion comprising ethylene-vinyl ester copolymer, as the polyoxyalkylene nonionic surface active agent, which comprises polyoxyalkylene alkyl ethers at a specific amount and substantially no polyoxyalkylene phenyl ethers Thus, they have completed the present invention.

SUMMARY OF THE INVENTION

The present invention provides an aqueous emulsion comprising a copolymer obtainable by polymerizing ethylene and vinyl ester, and a nonionic polyoxyalkylene surface active agent, wherein the nonionic polyoxyalkylene surface active agent comprises 1 to 10 parts by weight of polyoxyalkylene alkyl ether and 0.01 part by weight or less of polyoxyalkylene phenyl ether based on 100 parts by weight of vinyl ester units in the copolymer.

The present invention also provides a dried product obtained by drying the aqueous emulsion.

The present invention further provides a method for producing an aqueous emulsion comprising ethylene-vinyl ester copolymer which comprises polymerising ethylene and vinyl ester by an emulsion copolymerization in the presence of a nonionic polyoxyalkylene surface active agent, wherein the nonionic polyoxyalkylene surface active agent comprises 1 to 10 parts by weight of polyoxyalkylene alkyl ether and 0.01 part by weight or less of polyoxyalkylene phenyl ether based on 100 parts by weight of vinyl ester units in the copolymer.

EMBODIMENT OF THE INVENTION

The aqueous emulsion of the present invention comprises a copolymer having both an ethylene unit and a vinyl ester unit.

The vinyl ester unit includes, for instance, vinyl alkylates such as vinyl acetate, vinyl butylate, vinyl propionate, vinyl pivalate, vinyl laurilate, viny isonaconate, and vinyl versatate. More than two kinds of vinyl esters may be used as the vinyl ester unit ingredient. Among these vinyl ester units vinyl acetate is preferable.

In the copolymer the weight ratio of ethylene unit to 100 parts by weight of the vinyl ester unit usually ranges about from 5 to 70 parts by weight and more desirably about from 5 to 45 parts by weight. When the ethylene unit ratio is less than 5 parts by weight, then water resitance tends to decline while adhesive strength tends to decline when the ethylene unit ratio exceeds 70 parts by weight.

The other monomer unit of the copolymer contained in the aqueous emulsion of the present invention than ethylene unit and vinyl ester unit, may be contained so far as it is co-polymerizable with above two units, and more specifically the monomer unit includes vinyl halides such as vinyl chloride and vinyl bromide; vinylidene halides such as vinylidene chloride; vinyl compounds such as vinyl phosphonate, vinyl sulfonates and their salts: aromatic vinyl compounds such as styrene, α-methylstyrene, chlorostyrene; (meth)acrylic acids such as (meth)acrylic acid, methyl (meth)acrylate, butyl (meth)acrylate, 2-ethylhexyl (meta) acrylate, 2-hydroxyethyl (meth)acrylate and glycidyl (meth) acrylate; α, β-unsaturated dicarboxylic acids such as maleic acid, maleic anhydride, succinic acid and itaconic acid; nitrites such as (meth)acrylonitrile; acrylamides such as N-methylol acrylamide and N-butoxymethyl acrylamide; conjugate dienes such as butadiene and isoprene; allyl compounds such as allyl sulfonate, diallyl phthalate, triallyl cyanurate and triallyl isocyanurate.

The nonionic polyoxyalkylene surface active agent comprises from 1 to 10 parts by weight of polyoxyalkylene alkylether and 0.01 part by weight or less of polyoxyalkylene phenylether based on 100 parts by weight of the vinyl ester unit in the copolymer contained in the aqueous emulsion. It is particularly preferable that polyoxyalkylene phenylether is substantially not contained.

Polyoxyalkylene ether can be added to the aqueous emulsion after the copolymerization. In general, however, polyoxyalkylene ether has been used as an emulsifying agent when ethylene and vinyl ester are copolymerized.

Herein, polyoxyalkylene alkyl ether is usually a mixture of polyoxyalkylene alkyl ethers represented by the following general formula (1):

$$R^1CH_2\text{—}(R^2O)_n\text{—}H \qquad (1)$$

wherein $R^1$ represent an alkyl group having about from 1 to 20 carbon atoms which may be branched, $R^2$ represents an alkylene group such as ethylene group and propylene group, and may contain different alkylene groups in the same molecule, and n usually ranges about from 5 to 60.

As $R^1$, an alkyl having carbon atoms less than 11 is preferable. It is particularly preferable that the content of polyoxyalkylene alkyl ether wherein $R^1$ is an alkyl having carbon atoms less than 11 is more than 90% by weight in total of polyoxyalkylene alkyl ether, since water resistance of the dried product obtained by using the aqueous emulsion comprising the polyoxyalkylene alkyl ether tends to improve.

As $R^2$, ethylene group is particularly preferable.

The specific examples of polyoxyalkylene alkyl ethers include polyoxyethylene alkyl ethers such as polyoxyethylene octyl ether, polyoxyethylene nonyl ether, polyoxyethylene decyl ether, polyoxyethylene undecyl ether, polyoxyethylene lauryl ether, polyoxyethylene cetyl ether, polyoxyethylene stearyl ether, polyoxyethylene oleyl ether, and preferably those polyoxyethylene alkyl ethers comprising polyoxyethylene octyl ether, polyoxyethylene nonyl ether, polyoxyethylene decyl ether, polyoxyethylene undecyl ether, etc. as the main components are suitable.

Polyoxyethylene alkyl ethers, for instance, are prepared by addition reaction of ethylene oxide, propylene oxide and the like with alcohols which can be prepared by an oxo-reaction of polyolefins. The polyolefins are obtained by polymerization of olefin monomers such as ethylene, propylene and butene.

In addition, some of the commercially available polyoxyalkylene ethers such as LATEMUL® 135S-70 (renamed as EMULGEN® 135S-70) and LATEMUL® 1108 (renamed as EMULGEN® 1108), which are registered trademarks and are manufactured by Kao Corporation, may be used as ready.

Polyoxyalkylene phenyl ethers exist as a mixture of polyoxyalkylene phenyl ethers represented by the following general formula (2) ,and are usually prepared by etherification of an alkylphenol with a polyoxyalkylene:

$$R^3\text{-Ph-O-}(R^4O)m\text{-H} \qquad (2)$$

wherein $R^3$ represent an alkyl group having about from 1 to 20 carbon atoms which may be branched, $R^4$ represents an alkylene group such as ethylene group and propylene group, preferably ethylene group , and may contain different alkylene groups in the same molecule, m usually ranges about from 5 to 60, and Ph represents a phenylene group unsubstituted or substituted by halogen atom(s) or alkyl group(s).

More specifically, the polyoxyalkylene phenyl ethers include polyoxyalkylene octylphenyl ether, polyoxyethylene nonylphenyl ether and the like.

A nonionic surface active agent other than polyoxylkylene alkyl ether and polyoxylkylene phenyl ether may be optionally comprised in the aqueous emulsion of the present invention. Examples thereof include polyoxyethylene-polyoxypropylene block copolymer in which the amount of addition of ethylene oxide is about 10 to 80% by weight, polyoxyalkylene aliphatic acid ester and polyoxyalkylene sorbitan aliphatic acid ester. Further the aqueous emulsion may contain, for example, an anion surface active agent such as alkylsulfate, alkylbenzene sulfonate, alkylsulfosuccinate, alkyldiphenylether disulfonate, polyoxyalkylene alkysulfunate, polyoxyalkylene alkylphosphate. Moreover, the aqueous emulsion may contain, for instance, a protective colloid such as a cellulose-, or fiber-based derivative including polyvinyl alcohol, a partially saponified polyvinyl alcohol, methyl cellulose, carboxymethy cellulose and hydroxyethyl cellulose and the like.

As an example of the method for producing the aqueous emulsion of the present invention, a method comprising polymerizing ethylene and vinyl ester by an emulsion copolymerization in water in the presence of polyoxyalkylene alkyl ether(s), as a nonionic polyoxyalkylene surface active agent, and in the substantial absence of polyoxyalkylene phenyl ether(s) may be mentioned.

As a more specific example of the method for producing the aqueous emulsion of the present invention, the following method may be mentioned: 1 to 10 parts by weight of polyoxyalkylene alkyl ether based on 100 parts by weight of vinyl ester, a monomer which is co-polymerizable with vinyl ester or the like, a protective colloid, and a pH adjusting agent are mixed in water. Further, a block co-polymer of polyoxyethylene-polyoxypropylene, and an anionic surface active agent are added ,if required. 0.01 part by weight or less of polyoxyalkylene phenyl ether based on 100 parts by weight of vinyl ester may also be mixed, although it is preferable that polyoxyalkylene phenyl ether is not mixed. The mixture is warmed to about 30 to 80° C. under nitrogen atmosphere. After replacing nitrogen by ethylene, the mixture is pressurized up to about 0 to 10 Mpa, preferably about 1 to 7 Mpa and a radical initiator and a vinyl ester monomer, and a monomer which is copolymerizable with ethylene upon necessity, are added and the mixture is subjected to polymerization.

Herein, examples of the radical initiator include oxidizing agents such as hydrogen peroxide, potassium persulfate, sodium persulfate, ammonium persulfate, tert-bytul hydroperoxide to be used alone or a redox system in which a reducing agent such as L-, D-ascorbic acid, sulfite, rongalite and ferrous sulfate is used in combination with an oxidizing agent.

Further examples of the pH adjusting agent include following substances: acids such as hydrochloric acid, phosphoric acid, acetic acid, succinic acid and carbonic acid and their salt; bases such as alkali metal hydroxide, ammonia water and amine. Examples of the chain transfer agent include mercaptan.

The dried product is obtained by drying thus obtained aqueous emulsion. In addition the dried product may contain a formulation agent such as anti-foaming agent, a foaming agent, a thickening agent, a viscosity modifier, a filler, a flame-retardant and a pigment.

The present invention is further explained in details by way of Examples. It should be noted, however, that the scope of the invention is not limited by the Examples. In the Examples part(s) and notation of % are based on weight, unless otherwise noted.

Non-volatile content is determined as the weight ratio (%) of the resulted dried product to the sampled aqueous emulsion after the following procedure: Take about 1 g of aqueous emulsion accurately on a previously dried aluminum boat and weigh precisely, and then dried at 105° C. for 2 hours in a constant temperature drying oven.

EXAMPLE 1

In an autoclave, a solution consisting of water and the following ingredients were charged:

| | |
|---|---|
| Water | 80 parts |
| vinyl acetate | 30 parts |
| hydroxyethyl cellulose | 1.5 parts |
| *LATEMUL ® 1135S-70 | 0.7 part |
| **LATEMUL ® 1108 | 0.7 part |
| ferrous sulfate heptahydrate | 0.02 part |
| sodium acetate | 0.06 part |
| acetic acid | 0.1 part |

Note
*LATEMUL ® 1135S-70 (renamed as EMULGEN ® 1135S-70) is manufactured by Kao Corporation, the content of polyethylene Cn ≦11 alkyl ether is more than 90% by weight and the average number of addition of polyethylene group n = 35, the main component is polyethylene undecyl ether.
Note
**LATEMUL ® 1108 (renamed as EMULGEN ® 1108) is manufactured by Kao Corporaton, the content of polyethylene Cn ≦11 alkyl ether is more than 90% by weight and the average number of addition of polyethylene group n = 8, the main component is polyethylene undecyl ether.

Note*: LATEMUL® 1135S-70 (renamed as EMULGEN® 1135S-70) is manufactured by Kao Corporation, the content of polyoxyethylene Cn≦11 is more than 90% by weight and the average number of addition of polyoxyethylene group n=35, the main component is polyoxyethylen undecyl ether.

Note*: LATEMULE® 1108 (renamed as EMULGEN® 1108) is manufactured by Kao Corporation, the content of polyoxyethylene Cn≦11 is more than 90% by weight and the average number of addition of polyoxyethylene group n=8, the main component is polyoxyethylen undecyl ether.

The inside atmosphere of autoclave was replaced by nitrogen. After the temperature of the content in the autoclave had been raised to 50° C. then it was pressurized by ethylene to 5.0 MPa. and 1.1 parts/h of 2.5% sodium persulfate aqueous solution, 0.8 parts/h of 9% Rongalite aqueous solution were added to the autoclave to initiate polymerization. After the temperature rise of the liquid in the autoclave had been confirmed, 70 parts of vinyl acetate was added over 3 hours. While the temperature of the liquid in the vessel was being maintained at 50° C., after passage of time for 5 hours from the initiation of polymerization the oxidizing agents were shifted to 3% sodium persulfate aqueous solution and 2% tert-butylhydroperoxide aueous solution. They were added into the vessel at a rate of 6 parts/h. When the content of residual vinyl acetate monomer had reached less than 1%, then the autoclave was cooled. After the unreacted ethylene had been removed out of the vessel the resulted product was taken out. An ethylene-vinyl acetate copolymer having 30 parts of ethylene unit to 100 parts of vinyl acetate unit and glass transition temperature of 7° C. was obtained in an aqueous emulsion form with non-volatiles 55% and viscosity 170 mPa.s.

EXAMPLE 2

In an autoclave, a solution consisting of water and the following ingredients were charged:

| | |
|---|---|
| Water | 90 parts |
| vinyl acetate | 30 parts |
| hydroxyethyl cellulose | 1.5 parts |
| LATEMUL ® 1135S-70 | 1.5 part |
| LATEMUL ® 1108 | 1.5 part |
| ferrous sulfate heptahydrate | 0.02 part. |

The inside atmosphere of autoclave was replaced by nitrogen. After the temperature of the content in the autoclave had been raised to 50° C. then it was pressurized by ethylene to 2.0 MPa. and 0.8 parts/h of 2% sodium persulfate aqueous solution, 0.6 parts/h of 1.5% Rongalite aqueous solution were added to the autoclave to initiate polymerization. After the temperature rise of the liquid in the autoclave had been confirmed, 70 parts of vinyl acetate was added over 4 hours. While the temperature of the liquid in the vessel was being maintained at 50° C., after passage of time for 5 hours from the initiation of polymerization the oxidizing agents were shifted to 6% sodium persulfate aqueous solution. They were added into the vessel at a rate of 1.5 parts/h. When the content of residual vinyl acetate monomer had reached less than 1%, then the autoclave was cooled. After the unreacted ethylene had been removed out of the vessel the resulted product was taken out. An ethylene-vinyl acetate copolymer having 12 parts of ethylene unit to 100 parts of vinyl acetate unit and glass transition temperature of 10° C. was obtained in an aqueous emulsion form with non-volatiles 51% and viscosity 660 mpa.s.

EXAMPLE 3

In an autoclave, a solution consisting of water and the following ingredients were charged:

| | |
|---|---|
| Water | 70 parts |
| vinyl acetate | 10 parts |
| sodium vinyl sulfonate | 0.2 part |
| LATEMUL ® 1135S-70 | 4 parts |
| LATEMUL ® 1108 | 2 parts |
| Ammonium persulfate | 0.2 part |
| ferrous sulfate heptahydrate | 0.02 part |
| acetic acid | 0.1 part |

The inside atmosphere of autoclave was replaced by nitrogen. After the temperature of the content in the autoclave had been raised to 50° C. then it was pressurized by ethylene to 4.0 MPa. and 0.8 parts/h of 8t ammonium persulfate aqueous solution, 1.3 parts/h of 2.0% Rongalite aqueous solution were added to the autoclave to initiate polymerization. After the temperature rise of the liquid in the autoclave had been confirmed, 7 parts by weigh of an aqueous solution containing 0.2 part by weight of sodium vinyl sulfonate and 90 parts of vinyl acetate was added over 4 hours. While the temperature of the liquid in the vessel was being maintained at 50° C., ethylene was added for 3 hours to maintain the inner pressure at 4.0 Mpa. After passage of time for 5hours from the initiation of polymerization, 8% sodium persulfate aqueous solution, the oxidizing agents, was added into the vessel at a rate of 3.5 parts/h and 5% Rongalite aqueous solution was added into the vessel at a rate of 3 parts/h. When the content of residual vinyl acetate monomer had reached less than 1%, then the autoclave was cooled. After the unreacted ethylene had been removed out of the vessel the resulted product was taken out. An ethylene-vinyl acetate copolymer having 29 parts of ethylene unit to 100 parts of vinyl acetate unit and glass transition temperature of −6° C. was obtained in an aqueous emulsion form with non-volatiles 56% and viscosity 310 mPa.s.

EXAMPLE 4

In an autoclave, a solution consisting of water and the following ingredients were charged:

| | |
|---|---|
| Water | 180 parts |
| vinyl acetate | 30 parts |
| vinyl chloride | 40 parts |
| hydroxyethyl cellulose | 5 parts |
| LATEMUL ® 1135S-70 | 4 parts |
| LATEMUL ® 1108 | 4 part |
| ferrous sulfate heptahydrate | 0.006 part |
| sodium acetate | 0.2 part |
| acetic acid | 0.1 part |

The inside atmosphere of autoclave was replaced by nitrogen. After the temperature of the content in the autoclave had been raised to 50° C. then it was pressurized by ethylene to 3.5 MPa. and 5 parts/h of 3% sodium persulfate aqueous solution, 2 parts/h of 5% Rongalite aqueous solution were added to the autoclave to initiate polymerization. After the temperature rise of the liquid in the autoclave had been confirmed, 70 parts of vinyl acetate, 25 parts of 13% N-methylol acrylamide aqueous solution and 90 parts of vinyl chloride were added over 5 hours. While the temperature of the liquid in the vessel was being maintained at 50° C., after passage of time for 5 hours from the initiation of polymerization the oxidizing agents were shifted to 8% sodium persulfate aqueous solution and 1% tert-butyl hydroperoxide aueous solution. They were added into the vessel at a rate of 12 parts/h. When the content of residual vinyl acetate monomer had reached less than 1%, then the autoclave was cooled. After the unreacted ethylene had been removed out of the vessel the resulted product was taken out. An ethylene-vinyl acetate copolymer having 12 parts of ethylene unit and 120 parts of vinyl chloride unit to 100 parts of vinyl acetate unit and glass transition temperature of 22° C. was obtained in an aqueous emulsion form with non-volatiles 50% and viscosity 62 mPa.s.

EXAMPLE 5

In an autoclave, a solution consisting of water and the following ingredients were charged:

| | |
|---|---|
| Water | 85 parts |
| vinyl acetate | 33 parts |
| hydroxyethyl cellulose | 0.5 parts |
| LATEMUL ® 1135S-70 | 1 part |
| LATEMUL ® 1108 | 1 part |
| Sodium lauryl sulfate | 1 part |
| ferrous sulfate heptahydrate | 0.002 part |
| sodium acetate | 0.08 part |
| acetic acid | 0.06 part |

The inside atmosphere of autoclave was replaced by nitrogen. After the temperature of the content in the autoclave had been raised to 50° C. then it was pressurized by ethylene to 6.5 MPa. and 2.3 parts/h of 6% sodium persulfate aqueous solution, 1.3 parts/h of 2.5% Rongalite aqueous solution were added to the autoclave to initiate polymerization. After the temperature rise of the liquid in the autoclave had been confirmed, 67 parts of vinyl acetate, 20 parts of 20% N-methylol acrylamide aqueous solution and 9 parts of 2-ethylhexyl acrylate were added over 5 hours. While the temperature of the liquid in the vessel was being maintained at 50° C., ethylene was added for 4 hours to maintain the inner pressure at 6.5 Mpa. When the content of residual vinyl acetate monomer had reached less than 1%, then the autoclave was cooled. After the unreacted ethylene had been removed out of the vessel the resulted product was taken out. An ethylene-vinyl acetate copolymer having 34 parts of ethylene unit and 9 parts of 2-ethylhexyl acrylate unit to 100 parts of vinyl acetate unit and glass transition temperature of −22° C. was obtained in an aqueous emulsion form with non-volatiles 51% and viscosity 100 mPa.s.

COMPARITIVE EXAMPLE 1

The polymerization process was performed in the same manner as in Example 1 except that *EMULGEN$^R$ 931 and **EMULGEN$^R$ 954 both having polyoxyethylene non-ylphenolether as the main component were used instead of LATEMUL$^R$ 1135S-70 and LATEMUL$^R$ 1101 both having polyoxyethylene undecylether as the main component. A ethylene-vinyl acetate copolymer having 25 parts of ethylene unit to 100 parts of vinyl acetate unit and glass transition temperature −4° C. was obtained in an aqueous emulsion form with non-volatiles 56%, viscosity 63 Pa.s.

Note:
*EMULGEN$^R$ 931: average number of addition of oxyethylene group n=31, manufactured by Kao Corporation.
**EMULGEN$^R$ 954: average number of addition of oxyethylene group n=54, manufactured by Kao Corporation.

COMPARITIVE EXAMPLE 2

The polymerization process was performed in the same manner as in Example 2 except that *EMULGEN$^R$ 931 and **EMULGEN$^R$ 954 both having polyoxyethylene non-ylphenolether as the main component were used instead of LATEMUL$^R$ 1135S-70 and LATEMUL$^R$ 1101 both having polyoxyethylene undecylether as the main component. A ethylene-vinyl acetate copolymer having 7 parts of ethylene unit to 100 parts of vinyl acetate unit and glass transition temperature 16° C. was obtained in an aqueous emulsion form with non-volatiles 51%, viscosity 530 Pa.s.

<Properties of Aqueous Emulsion>

The properties of the obtained aqueous emulsion are evaluated according to the following methods. The results were summarized in Table 1.

(1) Average Particle Diameter

Average particle diameter was determined by turbidimetry using a double-beam spectrophotometer (U-2000A, made by Hitachi, Ltd.).

(2) Sedimentation Volume

The polymer emulsion was diluted so that concentration of non-volatiles had become 30% by weight, and was poured into a 10 ml sedimentation tube, and then rotated at a rate of 3200 rpm/min for 5 minutes using a centrifugal equipment, and the sedimentation was measured in volume. It is known that smaller sedimentation volume indicates better storage stability.

(3) Mechanical Stability 90 g of aqueous emulsion was rotated for 5 minutes under conditions of 10 kg and 1000 rpm/min using Malon stability testing equipment, and was filtered the resulting aggregated materials by means of a stainless wire fabric of 100 mesh (100M). The filtrate was then filtered by means of a stainless wire fabric of 300 mesh (300M). The residual materials on the 100M and 300M wire fabrics were combined and washed with water, and then dried at 105° C., and weighed. Thus, the concentration of the residual materials in the emulsion specimen is obtained. It is also known that smaller amount of filtration residue indicates better mechanical stability.

<Properties of Dried Product (Film) and Wet Product (Film)>

A polyethylene film was uniformly coated by the obtained aqueous emulsion so that the coating film was provided in 1 mm thickness, and then was kept in a thermostatic chamber at 25° C. under a humidity of 60% for one week to dry. When preparation of membrane was difficult, the coated film was heated. After the film had been dried the polyethylene film was peeled out to prepare the test film specimens for the dried product, and then evaluated according to the following method. The results are summarized in Table 1. For the water-resistance test, the test film specimens were prepared so that the coating film was 0.5 mm in thickness.

To prepare the wet film specimens the resulted dry film was kept in water at room temperature for 1 day and test specimens were prepared.

(4) Water-resistant Property

The dried product was immersed in water, and transition of optical transmittance of film specimen for visible light (500 nm) was measured by a double beam spectrophotometer (U-2000A: made by Hitachi, Ltd.), and the time required for 30% transmittance of light was measured. The results are shown in Table 1. It is known that longer time required indicates better water-resistant property.

(5) Tensile Strength and Elongation

In order to prepare test specimens both the dried and wet coated films were stamped out by means of Dumbbell No.3, and test specimens were elongated up to maximum 1500% of the original sample at constant rate of 500 mm/min in a constant temperature cabinet using an Autograph (AG-50KNG: made by Shimadzu Corporation). Tensile strength and elongation at break were measured and the results are shown in Table 1.

TABLE 1

|  |  |  | Example |  |  |  |  | Comparative example |  |
|---|---|---|---|---|---|---|---|---|---|
|  |  |  | 1 | 2 | 3 | 4 | 5 | 1 | 2 |
| Aqueous emulsion | Average particle diameter ($\mu$m) |  | 0.7 | 0.45 | 0.33 | 0.57 | 0.44 | 0.8 | 0.43 |
|  | Sedimentation in volume (ml) |  | 0.07 | 0.15 | 0.1 | 0.4 | 0.1 | 0.3 | 0.4 |
|  | Mechanical stability (ppm) | 100 Mesh | 60 | 21 | 1 | 90 | 67 | 24 | 2115 |
|  |  | 300 Mesh | 87 | 79 | 57 | 40 | 62 | 46 | 522 |
| Dried film | Dried film | Water resistant property (second) | 550 | 860 | 740 | 3600 <** | 640 | 280 | 500 |
|  |  | Tensile strength (Mpa) | 6 | 13.9 | 4 | 16 | 1.3* | 6.9 | 18.5 |
|  |  | Elongation (%) | 1040 | 290 | 995 | 215 | —* | 930 | 317 |
|  | Wet film | Tensile strength (Mpa) | 1.7 | 2.1 | 0.6 | 9 | 0.6* | 1.4 | 1.9 |
|  |  | Elongation (%) | 920 | 412 | 624 | 118 | —* | 980 | 384 |

Note:
*the values were taken when elongation of specimen reached 1500% of the original before break of specimens.
**transmittance of light is more than 30% even after the dried product was immersed for 3600 seconds.

The aqueous emulsion of the present invention shows an equivalent storage stability and mechanical stability to those of conventional aqueous emulsions. The dried product obtained from the aqueous emulsion of the present invention shows an equivalent strength to those obtained from conventional aqueous emulsions, and moreover, exhibits improved water resistant property. The wet product prepared by keeping the dried product in water also has good strength.

Therefore, the dried product obtained according to the present invention can be used for, for example, for an adhesive, a coating agent, a paint, a binder for paper, fiber and wall paper an admixture of cement and the like.

What is claimed is:

1. An aqueous emulsion comprising a copolymer obtained by polymerizing ethylene and vinyl ester, and a nonionic polyoxyalkylene surface active agent, wherein the nonionic polyoxyalkylene surface active agent comprises 1 to 10 parts by weight of polyoxyalkylene alkyl ether and 0.01 part by weight or less of polyoxyalkylene phenyl ether based on 100 parts by weight of vinyl ester units in the copolymer, and wherein the content of polyoxyalkylene alkyl ether having alkyl of 11 carbon atoms in said polyoxyalkylene alkyl ether is more than 90% by weight in total of said polyoxyalkylene alkyl ether.

2. The aqueous emulsion according to claim 1, wherein the weight ratio of ethylene unit to 100 parts by weight of the vinyl ester unit ranges about from 5 to 70 parts by weight.

3. A dried product obtained by drying the aqueous emulsion according to claim 1.

4. A method for producing an aqueous emulsion comprising ethylene-vinyl ester copolymer with comprises polymerizing ethylene and vinyl ester by an emulsion copolymerization in the presence of a nonionic polyoxyalkylene surface active agent, wherein the nonionic polyoxyalkylene surface active agent comprises 1 to 10 parts by weight of polyoxyalkylene alkyl ether and 0.01 part by weight or less of polyoxyalkylene phenyl ether based on 100 parts by weight of vinyl ester units in the copolymer, and wherein the content of polyoxyalkylene alkyl ether having alkyl of 11 carbon atoms in said polyoxyalkylene alkyl ether is more than 90% by weight in total of said polyoxyalkylene alkyl ether.

5. An aqueous emulsion comprising a copolymer of monomer units based on ethylene and vinyl ester; and a nonionic polyoxyalkylene surface active agent, wherein the nonionic polyoxyalkylene surface active agent comprises 1 to 10 parts by weight of polyoxyalkylene alkyl ether and 0.01 part by weight or less of polyoxyalkylene phenyl ether based on 100 parts by weight of vinyl ester units in the copolymer, and wherein said polyoxyalkylene alkyl ether is comprised of more than 90% by weight of polyoxyalkylene alkyl ether represented by the formula $R^1CH_2—(R^2O)_n—H$ in which $R^1$ represents an akyl group having 11 carbon atoms, $R^2$ represents an ethylene group, and n is from 5 to 60.

6. The aqueous emulsion according to claim 5, wherein the weight ratio of ethylene unit to 100 parts by weight of the vinyl ester unit ranges from about 5 to 70 parts by weight.

7. A dried product obtained by drying the aqueous emulsion according to claim 5.

8. The aqueous emulsion according to claim 5, wherein in the polyoxyethylene alkyl ether the alkyl has less than 11 carbon atoms.

9. The method according to claim 4, wherein in the polyoxyalkylene alkyl ether the alkyl has less than 11 carbon atoms.

10. An aqueous emulsion comprising a copolymer obtained by polymerizing ethylene and vinyl ester, and a nonionic polyoxyalkylene surface active agent, wherein the nonionic polyoxyalkylene surface active agent comprises 1 to 10 parts by weight of polyoxyalkylene alkyl ether and 0.01 part by weight or less of polyoxyalkylene phenyl ether based on 100 parts by weight of vinyl ester units in the copolymer, and wherein the main component of said polyoxyalkylene alkyl ether is polyoxyethylene undecyl ether.

11. An aqueous emulsion comprising a copolymer of monomer units based on ethylene and vinyl ester; and a nonionic polyoxyalkylene surface active agent, wherein the nonionic polyoxyalkylene surface active agent comprises 1 to 10 parts by weight of polyoxyalkylene alkyl ether and 0.01 part by weight or less of polyoxyalkylene phenyl ether based on 100 parts by weight of vinyl ester units in the copolymer, and wherein the main component of said polyoxyalkylene alkyl ether is polyoxyethylene undecyl ether represented by the formula $R^1CH_2-(R^2O)_n-H$ in which $R^1$ represents an akyl group having 11 carbon atoms, $R^2$ represents an ethylene group, and n is from 5 to 60.

* * * * *